(12) United States Patent
Kamat et al.

(10) Patent No.: US 8,286,002 B2
(45) Date of Patent: Oct. 9, 2012

(54) METHOD AND APPARATUS FOR PROVIDING SECURE REMOTE ACCESS TO ENTERPRISE NETWORKS

(75) Inventors: Sanjay D. Kamat, Marlboro, NJ (US); Pramod V. N. Koppol, Manalapan, NJ (US); Vijay Pochampalli Kumar, Holmdel, NJ (US); Dimitrios Stiliadis, Morganville, NJ (US)

(73) Assignee: Alcatel Lucent, Paris (FR)

( * ) Notice: Subject to any disclaimer, the term of this patent is extended or adjusted under 35 U.S.C. 154(b) by 990 days.

(21) Appl. No.: 11/293,843

(22) Filed: Dec. 2, 2005

(65) Prior Publication Data

US 2007/0130457 A1 Jun. 7, 2007

(51) Int. Cl.
G06F 11/30 (2006.01)
G06F 12/14 (2006.01)

(52) U.S. Cl. ............................................ 713/192; 726/6

(58) Field of Classification Search .......... 713/189–194, 713/153, 154; 726/26
See application file for complete search history.

(56) References Cited

U.S. PATENT DOCUMENTS

| | | | |
|---|---|---|---|
| 6,324,648 B1 * | 11/2001 | Grantges, Jr. .................. 726/12 |
| 6,629,248 B1 | 9/2003 | Stachura et al. |
| 6,894,994 B1 | 5/2005 | Grob et al. |
| 6,895,502 B1 * | 5/2005 | Fraser ............................ 713/168 |
| 6,985,502 B2 * | 1/2006 | Bunton .......................... 370/535 |
| 7,254,237 B1 * | 8/2007 | Jacobson et al. .............. 380/277 |
| 7,480,794 B2 * | 1/2009 | Kersey et al. .................. 713/153 |
| 7,640,427 B2 * | 12/2009 | Callas et al. .................. 713/153 |
| 7,769,994 B2 * | 8/2010 | Peles ............................. 713/153 |
| 2002/0129107 A1 | 9/2002 | Loughran |
| 2003/0002676 A1 | 1/2003 | Stachura |
| 2003/0012382 A1 | 1/2003 | Ferchichi et al. |
| 2003/0018916 A1 * | 1/2003 | Smith et al. .................... 713/201 |
| 2004/0133668 A1 * | 7/2004 | Nicholas, III ................. 709/223 |
| 2004/0214588 A1 * | 10/2004 | Tanimoto ....................... 455/466 |
| 2005/0138143 A1 * | 6/2005 | Thompson .................... 709/218 |
| 2006/0005239 A1 * | 1/2006 | Mondri et al. .................. 726/13 |
| 2006/0069742 A1 | 3/2006 | Segre |
| 2007/0130457 A1 | 6/2007 | Kamat et al. |
| 2007/0162582 A1 | 7/2007 | Betali et al. |
| 2008/0056494 A1 * | 3/2008 | Jacobson et al. .............. 380/255 |
| 2008/0183825 A1 | 7/2008 | Alicherry et al. |

FOREIGN PATENT DOCUMENTS

CN 1450744 (A) 10/2003
(Continued)

OTHER PUBLICATIONS

International Search Report and The Written Opinion of the International Searching Authority in corresponding PCT/US2006/046218, Oct. 5, 2007, Lucent Technologies Inc.

(Continued)

*Primary Examiner* — William Powers
*Assistant Examiner* — Dant Shaifer Harriman
(74) *Attorney, Agent, or Firm* — Wall & Tong, LLP

(57) ABSTRACT

The invention includes a method and apparatus for providing secure remote access to enterprise networks. An apparatus includes a network interface module adapted for maintaining a secure network connection with a network device independent of a power state of a host computer associated with the apparatus a storage module for storing information associated with the secure connection, and a processor coupled to the network interface and the memory where the processor is adapted for automatically initiating the secure connection without user interaction.

18 Claims, 6 Drawing Sheets

FOREIGN PATENT DOCUMENTS

| | | |
|---|---|---|
| JP | 11265332 A | 9/1999 |
| WO | WO 2004/012472 A1 | 2/2004 |

OTHER PUBLICATIONS

PCT Search Report & Written Opinion in PCT/US2008/000525, Lucent Technologies Inc., Applicant, dated Jun. 19, 2008, 12 pages.

$2^{nd}$ Written Opinion in PCT/US2008/000525, Lucent Technologies Inc., Applicant, dated Aug. 4, 2009, 5 pages.

IPRP in PCT/US2008/000525, Lucent Technologies Inc., Applicant, dated Dec. 5, 2009, 10 pages.

Japanese Patent Application No. 2008-543530, Office Action dated Feb. 22, 2011, Applicant: Alcatel-Lucent USA Inc, 3 pages.

Aug. 8, 2011 Office Action in Chinese Patent Application No. 200680045390.8, Lucent Technologies Inc., Applicant, 10 pages.

Mar. 31, 2011 Office Action in Chinese Patent Application No. 200680045390.8, Lucent Technologies Inc., Applicant, 9 pages.

Aug. 17, 2011 Office Action in JP 2009-548258, Alcatel-Lucent USA Inc., Applicant, 3 pages.

Mar. 14, 2012 Office Action in EP 06 849 914.4-2413, Lucent Technologies Inc., Applicant, 4 pages.

May 18, 2012 Office Action in Chinese Patent Application No. 200680045390.8, Lucent Technologies Inc., Applicant, 12 pages.

* cited by examiner

FIG. 4
400
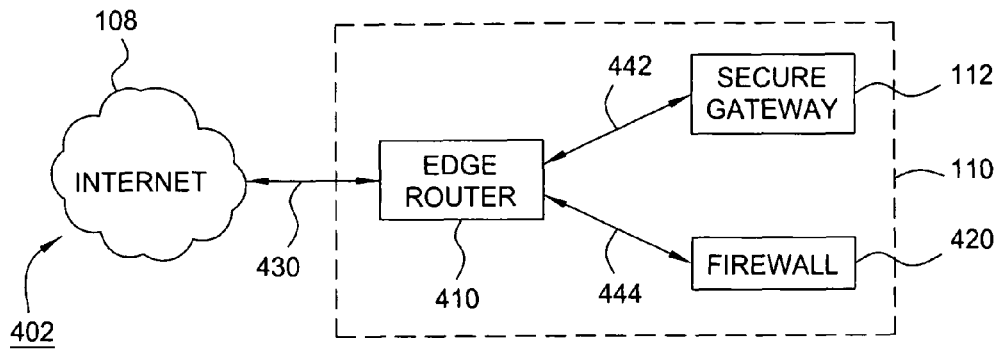
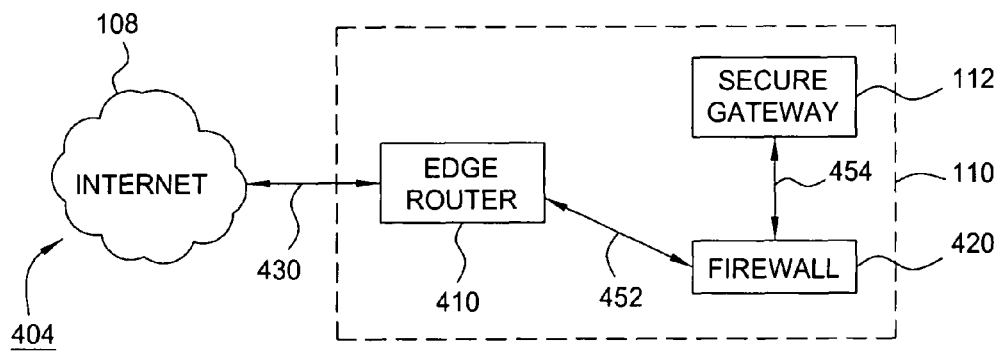
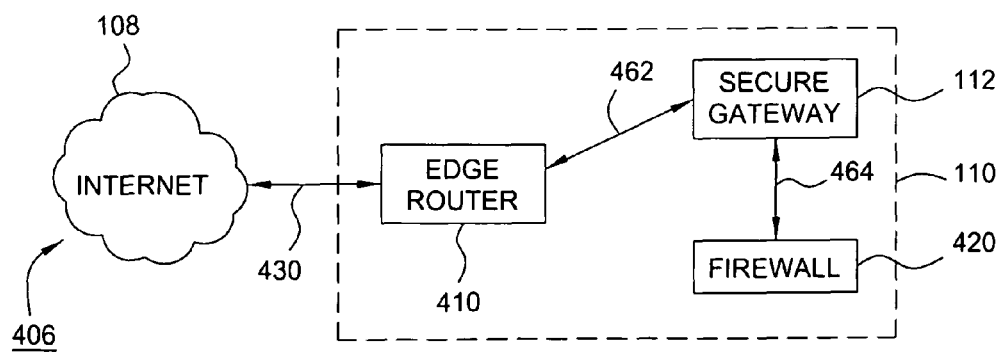

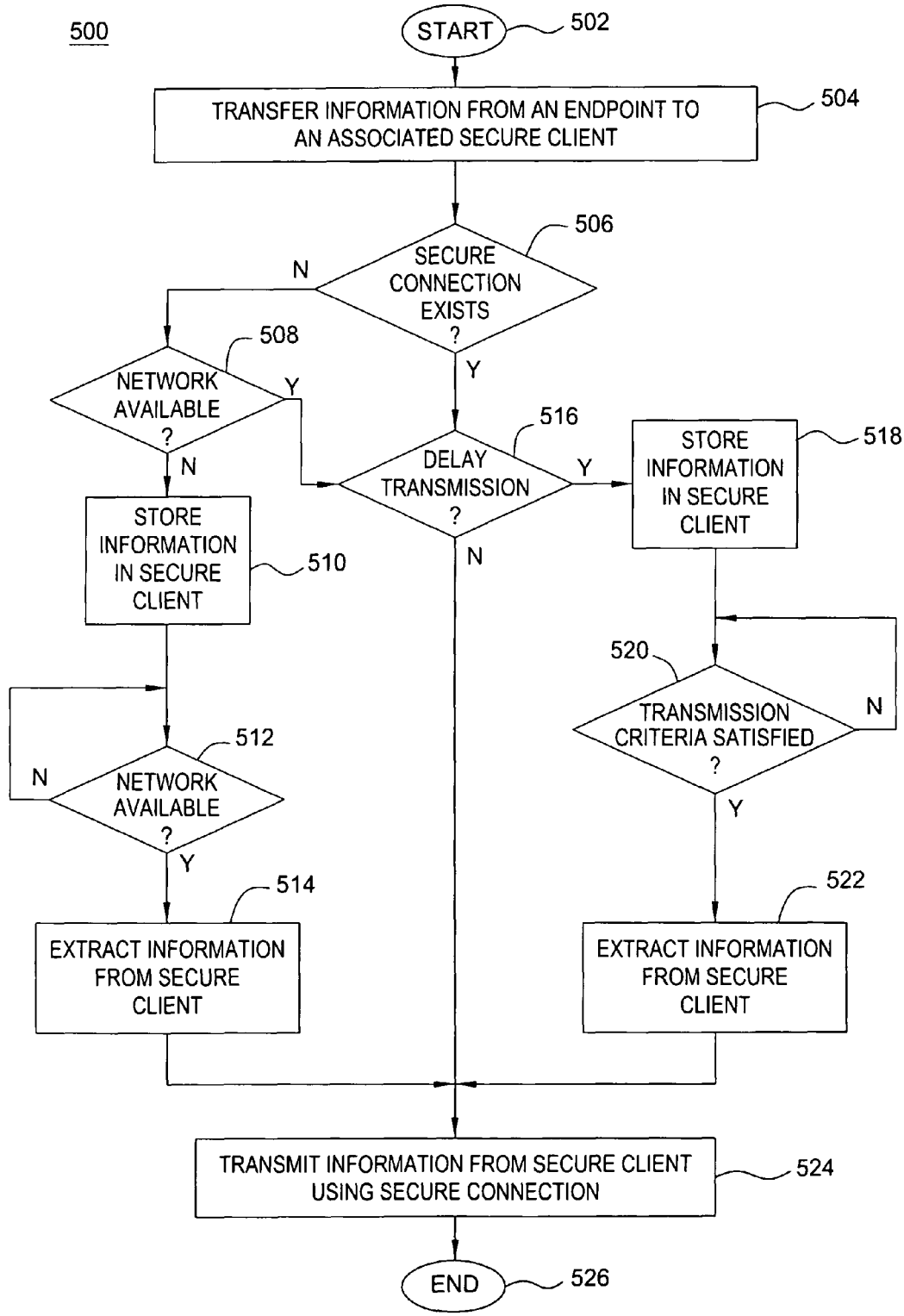

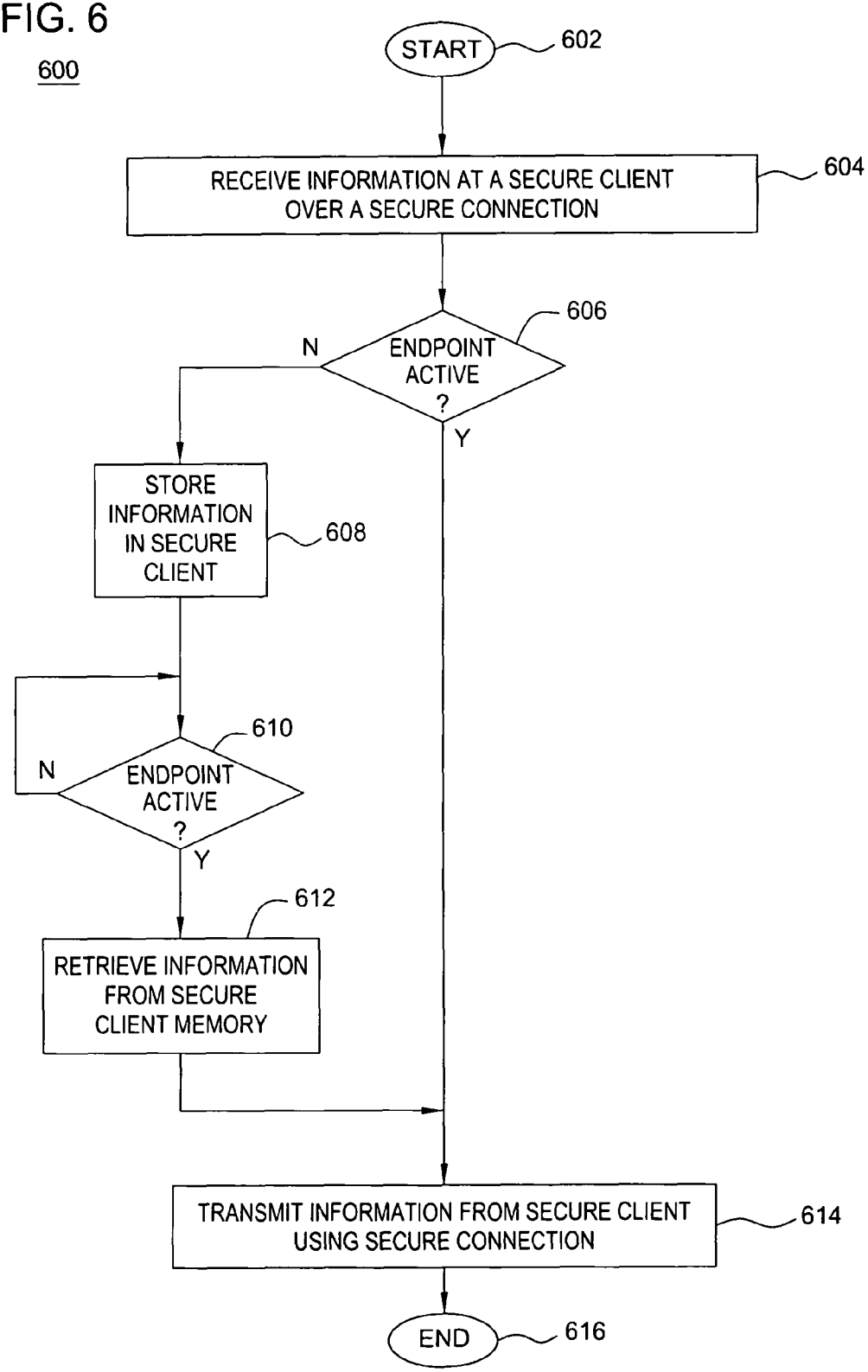

METHOD AND APPARATUS FOR PROVIDING SECURE REMOTE ACCESS TO ENTERPRISE NETWORKS

FIELD OF THE INVENTION

The invention relates to the field of communication networks and, more specifically, to providing secure remote access to enterprise networks.

BACKGROUND OF THE INVENTION

In general, broadband wireless access technologies enable enterprises to increase productivity by providing mobile enterprise users with continuous access to critical enterprise resources. The deployment of such technologies, however, is introducing enterprise security problems. For example, an enterprise user may connect to the public Internet using broadband wireless access while simultaneously maintaining a connection to the enterprise Intranet over an Ethernet connection. This concurrent connectivity may result in significant security violations.

A variety of security violations resulting in attacks on enterprise network infrastructure may originate from outside the enterprise premises. For example, from the outside of the enterprise premises, the enterprise user system may be infected by a virus/worm over the public Internet, and may propagate this virus/worm to the enterprise Intranet. In this example, if IP forwarding is enabled, the enterprise user system operates as a router, enabling a malicious outside intruder to bypass the enterprise firewall and access critical enterprise resources. Furthermore, the enterprise may be vulnerable to other attacks in which a malicious outside user utilizes an enterprise user system with dual connectivity in order to attack the enterprise. Although enterprises are deploying expensive mechanisms to prevent such outside access of the enterprise network, dual network connectivity provides malicious outside users a capability to access the enterprise network.

A variety of security violations resulting in attacks on enterprise network infrastructure may originate from inside the enterprise premises. In fact, enterprises increasingly realize that the majority of attacks on network infrastructure occur as a result of either internal sabotage or unintentional mistakes. For example, such activities may include an employee forwarding confidential documents over the public Internet without encryption or an executive exchanging Instant Messages without adhering to enterprise security policies. Furthermore, such activities may lead to computer espionage and violations of government regulations, resulting in significant financial damages to enterprises. Although enterprises are deploying expensive mechanisms and policy controls to prevent enterprise users from engaging in such activities, dual network connectivity enables users to by-pass such mechanisms and controls and directly connect to the Internet without being subjected to the mechanisms and controls.

SUMMARY OF THE INVENTION

Various deficiencies in the prior art are addressed through the invention of a method and apparatus for providing secure remote access to enterprise networks. An apparatus includes a network interface module adapted for maintaining a secure network connection with a network device independent of a power state of a host computer associated with the apparatus a storage module for storing information associated with the secure connection, and a processor coupled to the network interface and the memory where the processor is adapted for automatically initiating the secure connection without user interaction.

BRIEF DESCRIPTION OF THE DRAWINGS

The teachings of the present invention can be readily understood by considering the following detailed description in conjunction with the accompanying drawings, in which:

FIG. 4 depicts a high-level block diagram of a plurality of secure gateway deployment configurations according to one embodiment of the present invention;

FIG. 5 depicts a flow diagram of a method according to one embodiment of the present invention; and FIG. 6 depicts a flow diagram of a method according to one embodiment of the present invention.

To facilitate understanding, identical reference numerals have been used, where possible, to designate identical elements that are common to the figures.

DETAILED DESCRIPTION OF THE INVENTION

Figure 1:
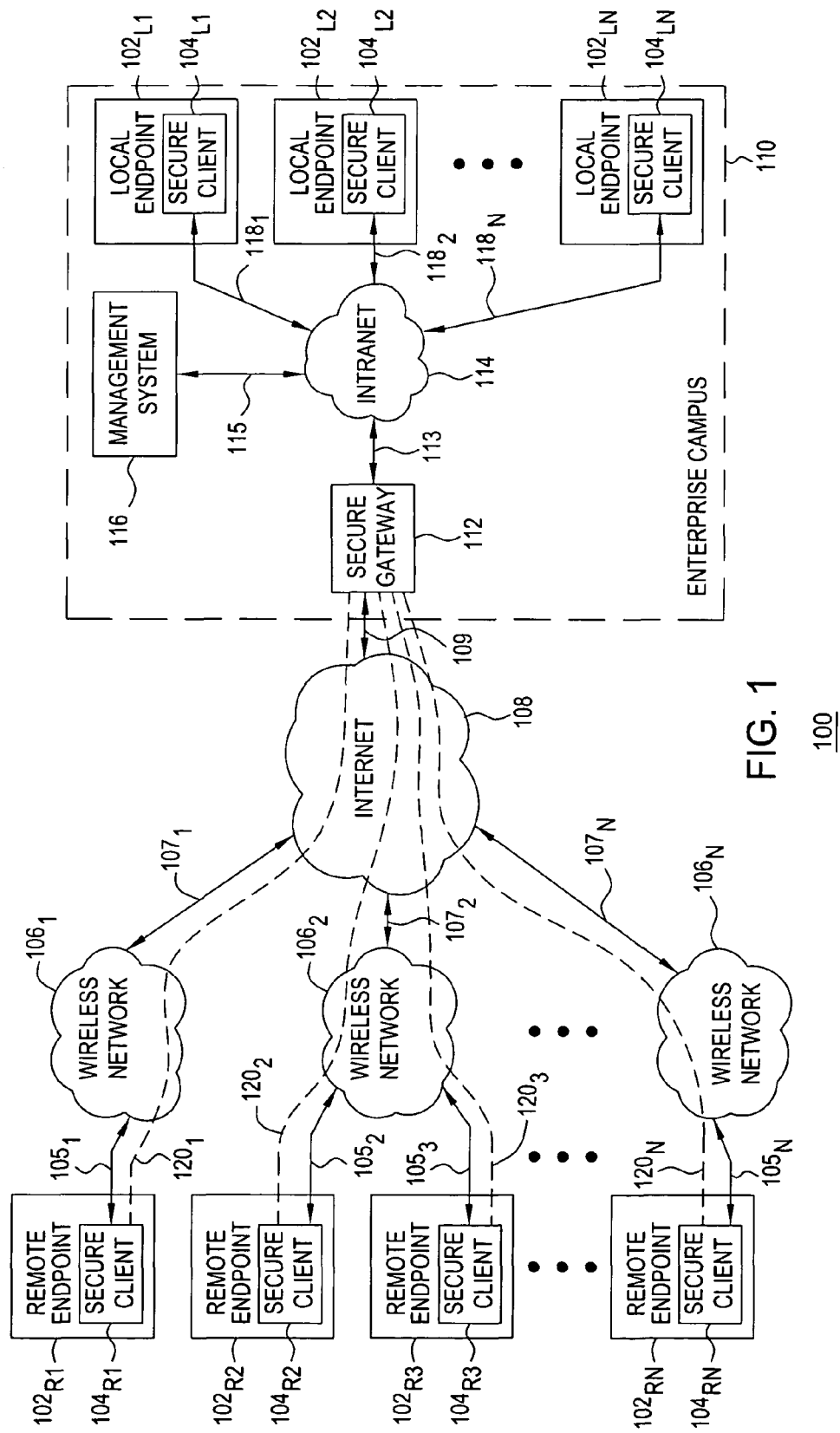
FIG. 1 depicts a high-level block diagram of a communication network according to one embodiment of the present invention.

In general, from the enterprise user perspective, the performance of the wireless network should match that of other broadband access technologies. While the main benefit of broadband wireless access is ubiquitous availability of network connectivity, such availability often comes at the expense of reduced bandwidth availability. The enterprise users require low-latency, high-bandwidth performance, irrespective of enterprise user location, connectivity type, system management and maintenance functions, and various other factors. In general, from an enterprise system administrator perspective, management and maintenance of systems supporting remote, mobile enterprise users is typically difficult and expensive. Since many such remote, mobile enterprise users (e.g., enterprise sales teams) are rarely within an enterprise campus, and constantly access network resources remotely while traveling, software updates must be performed while the enterprise users access the enterprise network from remote locations. Although such software updates may involve critical security patches, the software updates may also cause significant inconvenience (e.g., by consuming valuable system and network resources for transmitting and applying software updates) to the enterprise users. For example, a software patch may be initiated while the enterprise user is in an important meeting and requires immediate access to resources.

The present invention provides a secure system enabling enterprise users (e.g., remote enterprise users accessing a secure enterprise network remotely using a public network, local enterprise users accessing a secure enterprise network locally, and the like) to securely access an enterprise network while increasingly utilizing broadband wireless networks. The secure system ensures that enterprise user traffic originating from secure client devices is routed through a secure gateway (irrespective of user location). The secure system includes a secure client device associated with each endpoint device accessing the enterprise network. The secure system includes a secure gateway device by which each secure client device accesses the enterprise network. In one embodiment, the "always-on" capability of the secure client device enables constant communication between the endpoint device and the enterprise network. The secure, "always-on" system enables support of various features benefiting end users and system administrators. The features enabled by the secure, "always-on" system may include application acceleration features, remote management features, wireless network optimization features, and like features, as well as various combinations thereof.

In one embodiment, application acceleration features include background transfers, traffic filtering, data/protocol compression, tunnel address translation, protocol optimizations (e.g., at secure client devices, base stations, and the like), and the like, as well as various combinations thereof. In one embodiment, remote management features include enabling system administrators to push software upgrades, policy updates, back-up operations, and the like to remote endpoint devices even when the remote endpoint devices are not powered-on, enabling end users to schedule software upgrades, policy updates, back-up operations when the remote endpoint devices are not powered-on, and the like, as well as various combinations thereof. In one embodiment, wireless network optimization features include analyzing requested information transfers for distinguishing between delay-sensitive information transfers requiring instant responses (e.g., audio conversations) and delay-insensitive transfers not requiring instant responses (e.g., email transfers, data backup transfers, and the like), and delaying delay-insensitive information transfers in response to various conditions (e.g., until a wireless signal quality satisfies a threshold, when a threshold number of other clients are being served, and the like), and the like.

FIG. 1 depicts a high-level block diagram of a communication network. As depicted in FIG. 1, communication network 100 includes a plurality of remote endpoints (REs) $102_{R1}$-$102_{RN}$ (collectively, REs $102_R$) including a respective plurality of secure clients (SCs) $104_{R1}$-$104_{RN}$ (collectively, SCs $104_R$), a plurality of wireless networks (WNs) $106_1$-$106_N$ (collectively, WNs 106), an Internet 108, and an enterprise campus (EC) 110. As depicted in FIG. 1, EC 110 includes a plurality of local endpoints (LEs) $102_{L1}$-$102_{LN}$ (collectively, LEs $102_L$) including a respective plurality of secure clients (SCs) $104_{L1}$-$104_{LN}$ (collectively, $104_L$), an Intranet 114, a secure gateway (SG) 112, and a management system (MS) 116. The REs $102_R$ and LEs $102_L$ may be collectively referred to as endpoints 102.

As depicted in FIG. 1, REs $102_R$ communicate with WNs 106 using a plurality of wireless connections (WCs) $105_1$-$105_N$ (collectively, WCs 105). Specifically, SC $104_{R1}$ of RE $102_{R1}$ communicates with WN $106_1$ using WC $105_1$, SC $104_{R2}$ of RE $102_{R2}$ communicates with WN $106_2$ using WC $105_2$, SC $104_{R3}$ of RE $102_{R3}$ communicates with WN $106_2$ using WC $105_3$, and SC $104_{RN}$ of RE $102_{RN}$ communicates with WN $106_N$ using WC $105_N$. As depicted in FIG. 1, WNs 106 communicate with Internet 108 using a plurality of communication links (CLs) $107_1$-$107_N$ (collectively, CLs 107). The Internet 108 communicates with EC 110 (illustratively, with SG 112 of EC 110) using a communication link (CL) 109. As such, REs $102_R$ (and, specifically, SCs $104_R$) may access any network element within EC 110 using secure connections between SCs $104_R$ and SG 112.

As depicted in FIG. 1, LEs $102_L$ communicate with Intranet 114 using a plurality of communication links (CLs) $118_1$-$118_N$ (collectively, CLs 118). Specifically, SC $104_{L1}$ of LE $102_{L2}$ communicates with Intranet 114 using CL $118_1$, SC $104_{L2}$ of LE $102_{L2}$ communicates with Intranet 114 using CL $118_2$, and SC $104_{LN}$ of LE $102_{LN}$ communicates with Intranet 114 using CL $118_N$. The Intranet 114 communicates with SG 112 using a communication link (CL) 113. As such, LEs $102_L$ (and, specifically, SCs $104_L$) may access any network element external EC 110 using secure policies policed by SG 112. The MS 116 communicates with Intranet 114 using a communication link (CL) 115. As such, MS 116 may communicate with REs $102_R$ (specifically, with SCs $104_R$) using secure connections between SCs $104_R$ and SG 112.

As depicted in FIG. 1, REs $102_{R1}$-$102_{RN}$ (illustratively, SCs $104_{R1}$-$104_{RN}$) communicate with EC 110 using a plurality of Internet Protocol Security (IPSec) tunnels $120_1$-$120_N$ (collectively, IPSec tunnels 120). In one embodiment, IPSec tunnels 120 may be established by SCs $104_R$ in response to detection by SCs $104_R$ of an available WN 106 (irrespective of whether the associated REs $102_R$ are powered-on). In one embodiment, IPSec tunnels 120 may be established by SCs $104_R$ in response to requests by SG 112 for establishment of IPSec tunnels 120 (irrespective of whether the associated REs $102_R$ are powered-on). The IPSec tunnels 120 between SCs $104_R$ and SG 112 transport information between REs $102_R$ and various network devices in communication with SG 112 (illustratively, LEs $102_L$, MS 116, and the like). Although described with respect to IPSec tunnels 120, any secure connection between SCs $104_R$ and SG 112 may be utilized in one embodiment of the present invention.

As depicted in FIG. 1, communication network 100 generally illustrates a secure system for enterprise users located external to EC 110 (i.e., users associated with REs $102_R$) and enterprise users located internal to EC 110 (i.e, users associated with LEs $102_L$, and, optionally, system administrators associated with MS 116). As depicted in FIG. 1, the secure system includes: (i) secure client devices (illustratively, endpoints 102) integrating security, as well as application acceleration, remote management, wireless network optimization, and like features at the broadband wireless network interface; and (ii) secure gateway devices deployed at the edge of the enterprise (illustratively, SG 112 deployed as an interface between EC 110 and Internet 108) providing a secure interface to the secure client devices for supporting application acceleration, remote management, wireless network optimization, and like features.

In one embodiment of the present invention, when an enterprise user system equipped with a secure client is located external to the enterprise campus, the remote secure client may establish a secure tunnel to a secure gateway without any user intervention. A remote secure client according to one embodiment of the present invention operates as an active network component operable for establishing a secure network connection when the associated remote endpoint device is in an inactive power state (e.g., in sleep mode, powered-off, and the like) and in the absence of any user interaction. As such, a remote secure client of one embodiment of the present invention replaces previous network interface clients which operated as passive modems operable for establishing network connections only when the associated remote endpoint device was powered-on and in response to at least some user interaction).

In one embodiment of the present invention, when an enterprise user system equipped with a secure client is located internal to the enterprise campus, the local secure client may authenticate the user and traffic transmitted from the local secure client is routed directly to the enterprise Intranet (illustratively, Intranet 114), thereby ensuring that all enterprise user traffic is subject to the same enterprise policy controls before reaching the public Internet (illustratively, Internet 108). In one embodiment of the present invention, by implementing secure tunneling functionality within a local secure client, the enterprise user associated with a local endpoint including a local secure client is thereby prevented from by-passing the enterprise security policies.

In one embodiment, the secure system including the secure clients and secure gateways is adapted for supporting mobile users. When a device is mobile within an IP network, the public IP address of the mobile device can change as it moves from one location to another. When such an IP address change occurs, all active networking sessions will be terminated. This is clearly undesirable for a mobile user. An existing mechanism addressing this problem is Mobile IP, which requires special support on mobile devices, and which creates additional network overhead. The network overhead is further increased if the mobile device is an IPSec endpoint. In one embodiment, in order to avoid such disadvantages of Mobile IP, the secure system supports a mechanism for maintaining the IPSec tunnel without using Mobile IP, even when the public IP address of the client changes. In this embodiment, since networking applications on the mobile device use the tunnel IP address, they are not affected.

As described herein, a secure client according to one embodiment of the present invention includes a network interface module for interfacing with various wireless networks, a dedicated micro-controller, running a secure operating system, which is not subject to the same vulnerabilities as other end-user systems, and a non-volatile memory (e.g., flash memory). In one embodiment, when the wireless network interface through which network connectivity is established fails (e.g., the endpoint moved from indoors to outdoors), the secure client may select a next available wireless network interface from a priority list, prompt a user associated with the endpoint for another network interface, and the like. In one such embodiment, since the IPSec tunnel may have to be re-established, applications on the endpoint may be affected by the network interface failure.

In one embodiment, a secure client according to one embodiment of the present invention is adapted for being active (e.g., in wake-up mode, powered-on, and the like) even when the associated host computer (illustratively, endpoints 102) is powered-off (e.g., in sleep mode). As such, a secure client according to one embodiment of the present invention comprises an "always-on" capability which enables the secure client to complete network transfers while the associated host computer is idle, enables system administrators to remotely activate (e.g., wake-up) the associated host computer, and which enables like functions.

Although remote client devices and local client devices are described with respect to specific elements, functions, and the like, remote client devices in one embodiment of the present invention may include at least a portion of the elements and functions described with respect to local client devices and local client devices in one embodiment of the present invention may include at least a portion of the elements and functions described with respect to remote client devices. As such, client devices according to one embodiment of the present invention may include various combinations of elements, functions, and the like for supporting the various functions of the present invention.

As described herein, for remote secure clients (illustratively, SCs $104_R$), a secure gateway (illustratively, SG 112) according to one embodiment of the present invention supports security functions (e.g., terminates secure tunnels from the remote secure clients). As described herein, for local secure clients (illustratively, SCs $104_L$), a secure gateway according to one embodiment of the present invention supports security functions (e.g., manages network access (e.g., for local secure clients (illustratively, SCs $104_L$), management systems (illustratively, MS 116), and the like), manages user credentials, security policies, and the like, and performs like security functions).

As described herein, a secure gateway according to one embodiment of the present invention, complementary to supported security functions, may support application acceleration, remote management, wireless network optimization, and like functions. For example, a secure gateway according to one embodiment of the present invention may support compression mechanisms, connection management (e.g., managing the mobility aspects of connections by allowing users to roam between interfaces and/or networks with minimal disruption), connection optimization (e.g., hiding the limitations of different access technologies from the applications), and various other functions.

As depicted in FIG. 1, MS 116 is a management system adapted for communicating with secure clients and secure gateways. In one embodiment, MS 116 communicates with secure clients (illustratively, SCs $104_R$ and SCs $104_L$) for pushing software upgrades, policy updates, back-up operations, and the like to associated endpoint devices (illustratively, REs $102_R$ and LEs $102_L$, respectively). In one embodiment, MS 116 communicates with secure gateways (illustratively, SG 112) for distributing security policy updates, managing inventories and end-user policies, and performing like functions. In one embodiment, MS 116 provides various mechanisms supporting system administrator functions.

In one embodiment, MS 116 includes at least one of a user management interface, a policy management interface, a secure client access interface, a maintenance interface, network intrusion countermeasure control functions, and like interfaces, functions, and associated processors, memories, support circuits, and the like, as well as various combinations thereof. In one embodiment, a user management interface enables system administrators to manage secure client inventories, user-client-computer associations, and the like. In one embodiment, a policy management interface defines network policies, resource access policies, and the like. In one embodiment, a client access interface enables system administrators to access remote secure clients (independent of the network connection type). In one embodiment, a maintenance interface enables remote maintenance of clients, including software updates, virus/firewall policy updates, and the like. In one embodiment, administratively controlled network intrusion countermeasures include protection of secure client flash memory and the remote endpoint (erase flash memory and disable hard disk if secure client is lost or stolen).

Figure 2:
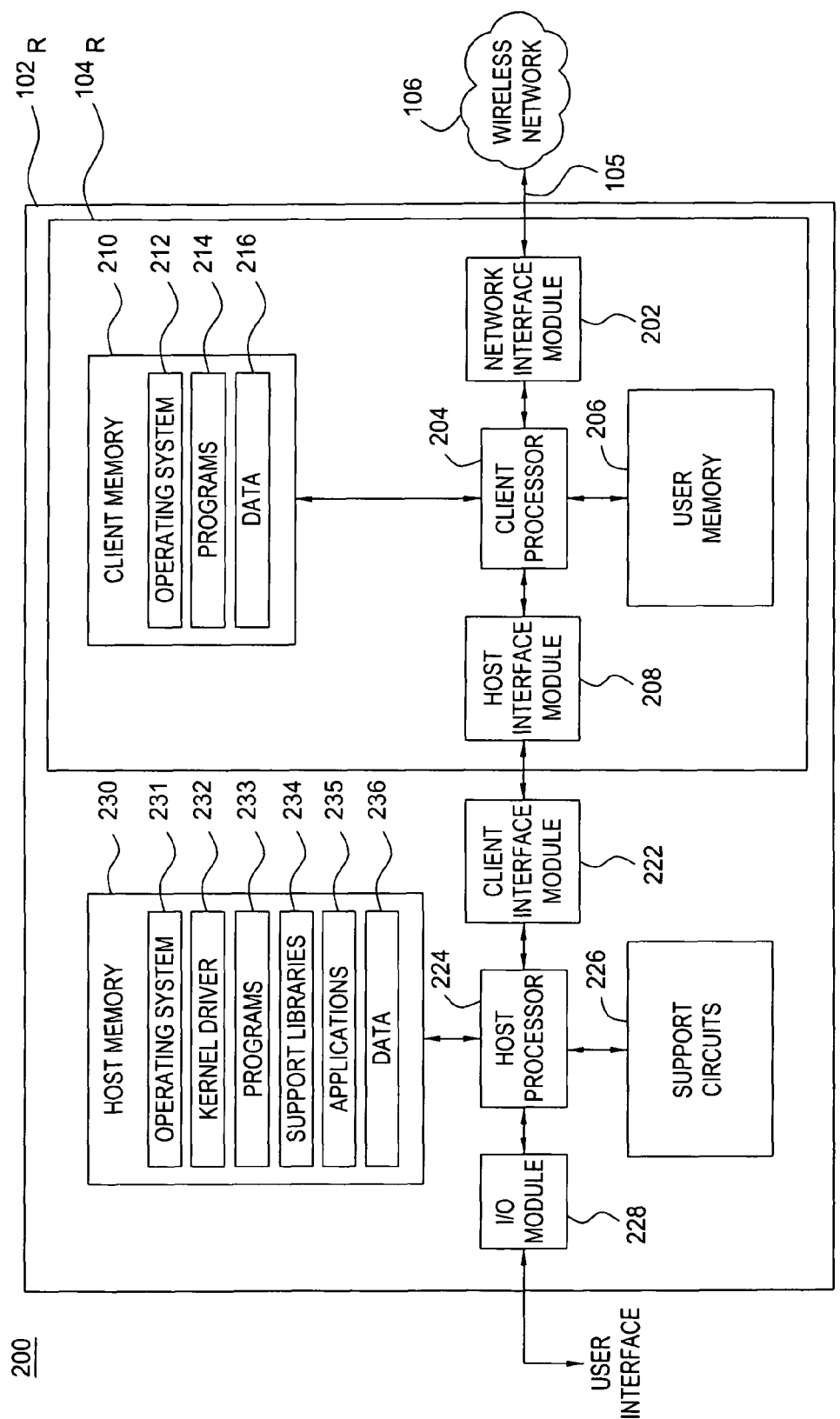
FIG. 2 depicts a high-level block diagram of one of the endpoints of the communication network of FIG. 1 according to one embodiment of the present invention.

FIG. 2 depicts a high-level block diagram of one of the secure client devices of the communication network of FIG. 1. In one embodiment, secure client 104 depicted and described with respect to FIG. 2 is a secure client associated with a remote endpoint (illustratively, one of the SCs $104_R$ associated with a corresponding one of the REs $102_R$, as depicted in FIG. 1). In one embodiment, secure client 104 depicted and described with respect to FIG. 2 is a secure client associated with a local endpoint (illustratively, one of the SCs $104_L$ associated with a corresponding one of the LEs $102_L$, as depicted in FIG. 1). Although depicted as including specific combinations of components, secure client 102 may include fewer or more components arranged in similar or different configurations.

As depicted in FIG. 2, SC 104 comprises network interface module (NIM) 202, a client processor (CP) 204, a user memory (UM) 206, a host interface (HI) 208, and a client memory (CM) 210. The CM 210 includes an operating system (OS) 212, programs 214, and data 216. As depicted in FIG. 2, CP 204 is coupled to NIM 202, UM 206, HI 208, and CM 210. As depicted in FIG. 2, NIM 202 interfaces with at least one external network. In one embodiment, in which the secure client is a remote secure client (illustratively, SC $104_R$), NIM 202 communicates with a wireless network (illustratively, one of WNs 106 depicted in FIG. 1). In one embodiment, in which the secure client is a local secure client (illustratively, SC $104_L$), NIM 202 communicates with an enterprise network (illustratively, Intranet 114 depicted in FIG. 1).

As depicted in FIG. 2, SC 104 may be implemented with various combinations of elements, and associated functions. In one embodiment, SC 104 may be implemented in a Cardbus (32-bit) PC-Card format. In one embodiment, SC 104 may be compatible with PC platforms supporting a type-II PCMCIA slot. In one such embodiment, SC 104 may support at least D0, D1, D2, and D3 power states on the Cardbus interface and may be able to maintain power at the D3 hot state. In one embodiment, different instantiations of SC 104 may be supported, including support for various combinations of wireless networks.

In one embodiment, SC 104 supports data traffic processing including full IP stack operations, Point-to-Point Protocol (PPP) encapsulations, IPSec encapsulations, encryption/decryption operations, data/header compression, and the like, as well as various combinations thereof. In one embodiment, SC 104 includes additional features such as internal and external antenna support, SIM compatibility, an embedded flash memory with separate partition for user access, an embedded processor sub-system with local DRAM, and integrated infrastructure for two-factor authentication, an external on/off switch for the network interface which is independent of host computer state (i.e., independent of whether the host computer is active (e.g., powered-on) or inactive (e.g., powered-off)), and the like, as well as various combinations thereof.

As depicted in FIG. 2, NIM 202 may be implemented as a wireless modem providing IP network connectivity to an associated host computer (illustratively, endpoint 102) over a wireless network. The NIM 202 may be configured for interfacing with various combinations of wireless networks including 1× Evolution (1×EV) data only (EVDO) networks, single carrier (1×) radio transmission technology (1×RTT) networks, high-speed downlink packet access (HSPDA) networks, General Packet Radio Service (GPRS) networks, wireless fidelity (WiFi) networks, Universal Mobile Telecommunications System (UMTS) networks, and like public and private wireless networks. As such, different instantiations of NIM 202 may support different combinations of wireless interfaces.

As depicted in FIG. 2, NIM 202 operates as a transmitter and receiver. In one embodiment, the transmitter functionality of NIM 202 includes various configurable parameters including minimum transmit power, maximum transmit power, frequency error, out-of-band emissions, adjacent channel leakage power ration, spurious emissions, inter-modulation, error vector magnitude, peak code domain error, and the like, as well as various combinations thereof. In one embodiment, the receiver functionality of NIM 202 includes various configurable parameters including sensitivity, maximum input level, adjacent channel selectivity, blocking characteristics, in-band parameters, out-of-band parameters, narrowband parameters, spurious response, inter-modulation, spurious emissions, and the like, as well as various combinations thereof.

As depicted in FIG. 2, CP 204 is configured for performing at least a portion of the functions of the present invention as described herein, including security functions, secure connection initiation, user authentication, as well as application optimization, network optimization and control, and like functions. In one embodiment, CP 204 cooperates with at least a portion of the components of endpoint 102 for performing various functions described herein. In one embodiment, while SC 104 is in a hot state (e.g., D3 hot state), and while NIM 202 is in a dormant mode, CP 204 may enter a sleep mode in order to conserve power.

As depicted in FIG. 2, UM 206 stores user information. In one embodiment, user information stored within UM 206 may be used by CP 204 or at least one other component (e.g., an authentication subsystem (not depicted)) for associating a user with computer hardware and an enterprise network. As depicted in FIG. 2, CM 210 stores OS 212, programs 214, and data 216. In one embodiment, CM 210 stores persistent data, security certificates, client synchronization data, and the like, as well as various combinations thereof. In one embodiment, UM 206 and CM 210 are implemented using a single memory component partitioned to form a user memory space and a system memory space. In one embodiment, UM 206 and CM 210 comprise non-volatile memory.

As depicted in FIG. 2, CM 210 stores OS 212, programs 214, and data 216. As depicted in FIG. 2, OS 212 is an on-card operating system hosting on-card remote access functions, applications, services, and the like, as well as various combinations thereof. In one embodiment, OS 212 provides a management link to an enterprise security center that enables active enterprise network management, such as tunnel monitoring, remote software/firmware updates, remote assistance, and the like, as well as various combinations thereof.

As depicted in FIG. 2, HI 208 operates as an interface between SC 104 and associated endpoint 102 (i.e., host system). In one embodiment, HI 208 facilitates transfer of information between SC 104 and endpoint 102. For example, HI 208 may facilitate transfer of information (e.g., emails created by a user on endpoint 102) from endpoint 102 for storage in CM 210 of SC 104 for transmission over a secure connection. For example, HI 208 may facilitate delivery of information (e.g., information received over a secure connection and stored in CM 210) to endpoint 102. In one embodiment, HI 208 provides interfaces to the host operating system (illustratively, OS 231) through the Advanced Configuration and Power Interface (ACPI) standard.

As depicted in FIG. 2, in addition to SC 104, endpoint 102 includes a client interface module (CIM) 222, a host processor (HP) 224, support circuits (SC) 226, an input-output (I/O) module 228, and host memory (HM) 230. The HM 230 includes an operating system (OS) 231 (e.g., Windows, Linux, and the like), kernel drivers (KDs) 232, programs 233, support libraries (SLs) 234, applications 235, and data 236. As depicted in FIG. 2, HP 204 is coupled to CIM 222, SC 226, I/O module 228, and HM 230. As depicted in FIG. 2, endpoint 102 comprises a personal computer (e.g., a laptop).

As depicted in FIG. 2, CI 222 operates as an interface between endpoint 102 (i.e., host system) and associated SC 104. In one embodiment, CI 222 facilitates transfer of information between SC 104 and endpoint 102. For example, CI 222 may facilitate transfer of information (e.g., emails created by a user on endpoint 102) from endpoint 102 for storage in CM 210 of SC 104 for transmission over a secure connection. For example, CI 222 may facilitate delivery of information (e.g., information received over a secure connection and stored in CM 210) to endpoint 102. In one embodiment, CI 222 provides interfaces to the host operating system (illustratively, OS 231) through the Advanced Configuration and Power Interface (ACPI) standard.

As depicted in FIG. 2, I/O module 228 operates as an interface between the user and the functions on the secure client. In one embodiment, I/O module 228 is adapted for interfacing with various user interfaces such as a display, a speaker, an output port, a user input device (such as a keyboard, a keypad, a mouse, and the like), storage devices (e.g., including but not limited to, a tape drive, a floppy drive, a hard disk drive or a compact disk drive), a receiver, a transmitter, and various other devices). As such, I/O module 228 supports any user interaction available from a personal computer. As depicted in FIG. 2, SCs 226 cooperate with HP 224 for performing various other functions according to one embodiment of the present invention.

As depicted in FIG. 2, HP 224 is configured for performing and/or supporting at least a portion of the functions of the present invention as described herein, including security functions, secure connection initiation, user authentication, as well as application optimization, network optimization and control, and like functions. In one embodiment, HP 224 cooperates with at least a portion of the components of SC 104 for performing various functions described herein.

In one embodiment of the present invention, endpoint 102 (i.e., various combinations of interactions between HP 224, CIM 222, SC 226, HM 230, and I/O module 228) implements various function according to one embodiment of the present invention. In one embodiment, endpoint 102 provides an interface between endpoint 102 and the secure client (illustratively, SC 104). In one embodiment, endpoint 102 provides the host driver for the secure client, incorporates mechanisms for directing all network connectivity to be routed through the secure client, logs and reports any malicious user activity to the secure gateway (illustratively, SG 112 depicted in FIG. 1), provides an interface for any user configurable parameters of the secure client, and like functions, as well as various combinations thereof.

As depicted in FIG. 2, HP 224 cooperates with various combinations of OS 231, KDs 232, programs 233, SLs 234, applications 235, and data 236 stored in HM 230 for performing various functions described herein. As such, the various functions of endpoint 102 are further described herein in the context of host software (e.g., cooperation of combinations of components of endpoint 102) adapted for performing such functions. As depicted and described with respect to FIG. 2, the host software includes kernel-mode software drivers (illustratively, KDs 232), graphical user interface (GUI) applications (illustratively, applications 235), and support libraries (illustratively, SLs 234).

In one embodiment, the kernel-mode software drivers include a secure client driver, a networking support driver, networking device drivers, and the like. The secure client driver support may be implemented to run as one process or multiple processes. In one embodiment, the networking support driver drives the wireless interface(s). In one embodiment, the networking support driver is always loaded. In one embodiment, the networking support driver is disposed between the networking device drivers and the secure client driver, thereby ensuring that all IP traffic traverses the secure client for secure communication with the enterprise (i.e., ensuring that no connection to the public Internet is possible without going through the enterprise network). Furthermore, low-level support for various functions (including remote administration, monitoring, security, and the like) is provided by both the secure client driver and the networking support driver. As such, endpoint 102 ensures that all network interfaces may be reached only after passing through a valid, present secure client.

In one embodiment, endpoint 102 provides networking support, tamper protection features, management applications, remote administration support, and the like, as well as various combinations thereof. In one embodiment, such functions may be provided using various management applications stored on endpoint 102 (illustratively, applications 235). In one embodiment, such applications provide support for configuration, monitoring, and connection establishment. In one embodiment, a service monitoring application displays interface statistics and current connection state. In one embodiment, a configuration application allows configuration of the operation of secure system as permitted by enterprise policy defined at the secure gateway. In one embodiment, a connection establishment application supports connections when a public IP address must first be negotiated through user interaction.

In general, the purpose of the secure client is to provide services to the associated endpoint. In one embodiment of the present invention, the endpoint and associated secure client operate together to provide various functions. In one embodiment, the endpoint and associated secure client operate together to provide security features, provide application acceleration features, provide remote system administration features, provide network optimization features, and provide other features, as well as various combinations thereof. In one embodiment, various power mode combinations may be supported for providing such functions, as depicted with respect to Table 1.

TABLE 1

| Endpoint | Secure Client | Network Interface | Notes |
| --- | --- | --- | --- |
| Off | Off | Off | Idle mode. |
| Off | On | On | Secure client powered-on by a battery. |
| Sleep Mode | Off | Off | Secure client powered-off as a result of: (1) an endpoint operation or (2) turning off external switch. |
| Sleep Mode | On | On | Secure client operates while laptop is in sleep mode. The network interface may be: (1) on or (2) in dormant mode. |
| On | Off | Off | Secure client is powered-off as a result of: (1) an endpoint operation or (2) turning off external switch. Endpoint has no network access in this mode. |
| On | On | On | Secure client operates as a network interface. |

Since the endpoint and associated secure client may only protect the associated enterprise when working properly, in one embodiment of the present invention, the endpoint and associated secure client operate together to provide tamper detection and protection features. As described in Table 2, various scenarios exist in which security is compromised. Although specific scenarios in which security is compromised are depicted and described with respect to FIG. 2, endpoints and associated secure clients may include various functions adapted for detecting and preventing such scenarios. In other words, endpoints and associated secure clients may include functions adapted for detecting and preventing attempts to bypass the security functionality of the present invention.

TABLE 2

| Endpoint Software | Secure Client | State Description |
|---|---|---|
| Not Running | Not Functioning | This state represents a problem. If the endpoint software is not running, then unrestricted access to the public Internet is possible, compromising the endpoint, and therefore the enterprise, the next time the endpoint is connected to the enterprise network. |
| Not Running | Functioning | This state represents the same problems as above. Since it is possible for the secure client to check that the driver is not running, the secure client will remember this violation and report it to the secure gateway. |
| Running | Not Functioning | This state represents the case where the client card has been removed from the system. As long as the host software is running, it can disable networking and possible take additional, configured actions such as locking the screen. |

In one embodiment, detection of attempts at tampering with either or both of the endpoint and the associated secure client may be performed by the endpoint and associated secure client. In one such embodiment, the secure client monitors the endpoint drivers and the endpoint drivers monitor each other and the secure client. If a component is compromised, at least a portion of the other components detect and report the tampering. In another embodiment, attempted tampering may be detected using any of a variety of server-driven challenge/response techniques that induce a wide range of cryptographically-protected integrity checks of at least one of the secure client and the associated endpoint.

In another embodiment, detection of attempts at tampering with either or both of the endpoint and the associated secure client may be performed by at least one other component (e.g., the secure gateway, a management system, and the like). In one such embodiment, endpoints and secure clients log activities and times at which specific conditions occur, and the logs are transmitted to at least one other device for analysis and correlation for detecting the effects of tampering. In one embodiment, audit trails may be generated for determining the sequence of events leading to security breaches (e.g., inappropriate transfer of intellectual property). In one embodiment, the endpoint is operates as a primary generator of log messages. In one such embodiment, if connectivity to the secure gateway is not available, the endpoint or secure client may cache log information in encrypted and authored files until connectivity is re-established.

In one embodiment, an enterprise may restrict which secure clients may operate with which endpoints. In one such embodiment, if a valid secure client is not present in the associated endpoint to which that secure client is assigned, various responses may be initiated. In one such embodiment, a security lock may be implemented. In general, security locks are typically USB devices that must be present in the computer in order to access the computer. Once removed, the screen locks until the security key is re-inserted. In this way, removal of the secure client results in an endpoint on which no users, remote or local, may work. In another such embodiment, all network traffic may be dropped. In another such embodiment, the endpoint is not bootable.

In one embodiment, the endpoint may be rendered unusable in response to a determination that the associated secure client is not disposed within an associated slot of the endpoint. For example, the endpoint software may perform actions such as disabling user interface components (e.g., mice, keyboards, and the like), blanking display screens, and performing like actions, as well as various combinations thereof. In one embodiment, actions performed in response to removal of the secure client from the endpoint may be determined by administrative configuration. In another embodiment, enforcement of the presence of the correct secure client may be enforced by encrypting the hard disk of the associated endpoint and to configure the secure client to perform at least a portion of the decrypting functions required for decrypting the endpoint hard disk.

Figure 3:
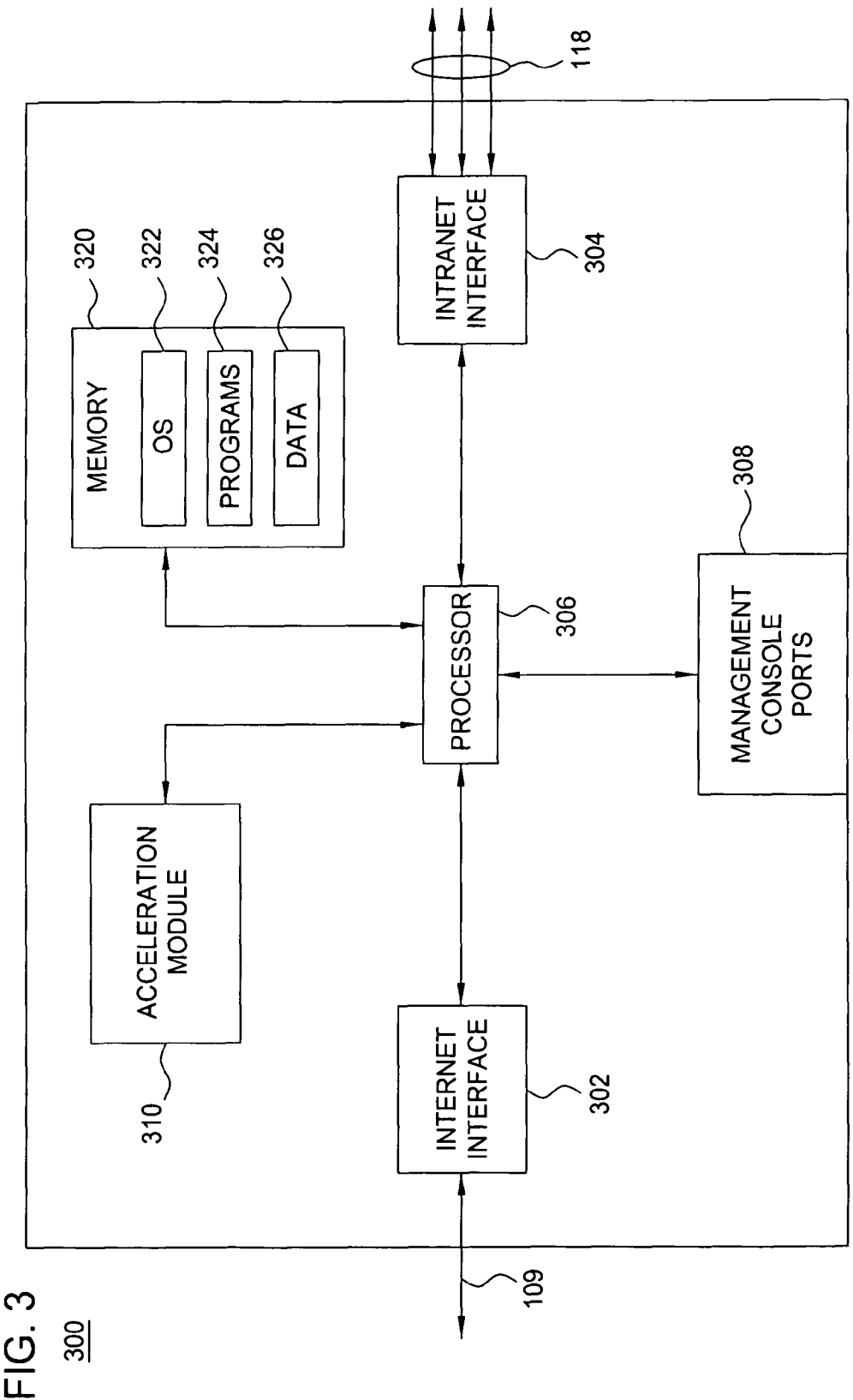
FIG. 3 depicts a high-level block diagram of the secure gateway of the communication network of FIG. 1 according to one embodiment of the present invention.

FIG. 3 depicts a high-level block diagram of the secure gateway of the communication network of FIG. 1. As depicted in FIG. 3, secure gateway 112 includes an Internet interface 302, an Intranet interface 304, a processor 306, management console ports 308, an acceleration module 310, and a memory 320. The memory 320 includes an operating system (OS) 322, programs 324, and data 326. As depicted in FIG. 3, processor 306 is coupled to Internet interface 302, Intranet interface 304, management console ports 308, acceleration module 310, and memory 320. Although depicted as including specific combinations of components, secure gateway 112 may include fewer or more components arranged in similar or different configurations.

As depicted in FIG. 3, Internet interface 302 is coupled to Internet 108 using CL 109. In one embodiment, Internet interface 302 interfaces with Internet 108 through at least one of an edge router, a firewall, and the like. In one embodiment, Internet interface 302 is adapted for terminating secure connections originating from remote endpoints (illustratively, from REs $102_R$ as depicted in FIG. 1). The Intranet interface 304 is coupled to Intranet 304 using CLs 118. In one embodiment, Intranet interface 304 is adapted for terminating secure connections originating from local endpoints (illustratively, from LEs $102_L$ as depicted in FIG. 1).

As depicted in FIG. 3, acceleration module 310 includes various acceleration mechanisms. In one embodiment, acceleration module includes an application acceleration mechanism for providing enterprise side support for application acceleration over wireless networks. In one such embodiment, acceleration module 310 is adapted for use in performing at least a portion of the application acceleration functions supported by the secure system of the present invention. In one embodiment, acceleration module 310 includes a wireless acceleration mechanism for optimizing performance of associated secure clients over low speed wireless networks. In one embodiment, acceleration module 310 supports encryption/decryption functions, key management functions, compression functions, and the like, as well as various combinations thereof. In one such embodiment, acceleration module 310 is adapted for use in performing at least a portion of the network optimization functions supported by the secure system of the present invention.

As depicted in FIG. 3, management console ports 308 are adapted for providing user interfaces enabling system administrators to perform various functions (e.g., initiate configuration actions, view configuration results, and the like). As such, management console ports 308 is adapted for interfacing with various user interfaces such as a display, a speaker, an output port, a user input device (such as a keyboard, a keypad, a mouse, and the like), storage devices (e.g., including but not limited to, a tape drive, a floppy drive, a hard disk drive or a compact disk drive), a receiver, a transmitter, and various other devices). In one embodiment, management console ports 308 are adapted for use in performing at least a portion of the remote network configuration functions supported by the secure system of the present invention.

As depicted in FIG. 3, processor 302 cooperates with various combinations of Internet interface 302, Intranet interface 304, management console ports 308, acceleration module 310, and memory 320 for supporting various functions according to one embodiment of the present invention. For example, processor 302 may support user authentication (e.g., based on a two factor challenge/response authentication mechanism, through an interface to industry standard authentication platforms (such as RSA SecureID, and the like), fine-grain policy control mechanisms for managing network and resource access on a per-user (or per-endpoint) basis where policies may include user identification, user group, remote access technology, location, and the like, and like mechanisms, as well as various combinations thereof.

In one embodiment of the present invention, security gateways are typically deployed at or near the edge of the enterprise network. Since associated firewalls, as well as other security components, are typically deployed at or near the edge of the enterprise network, various security gateway deployment configurations may be supported according to one embodiment of the present invention. In other words, although depicted in FIG. 1 as being disposed between the public Internet 108 and the enterprise intranet 114, SG 112 may be deployed in a plurality of different configurations. In one embodiment, the secure gateway cooperates with at least one of an access router, a firewall, and other application-level gateways as well as services such as NAP (network access protection) servers, and the like, as well as various combinations thereof.

FIG. 4 depicts a high-level block diagram of a plurality of secure gateway deployment configurations. As depicted in FIG. 4, the plurality of secure gateway deployment configurations includes a first configuration 402, a second configuration 404, and a third configuration 406. As depicted in FIG. 4, first configuration 402, second configuration 404, and third configuration 406 each include Internet 108 in communication with EC 110. As depicted in FIG. 4, EC 110 of each of first configuration 402, second configuration 404, and third configuration 406 included an edge router (ER) 410, SG 112, and a firewall 420. As depicted in FIG. 4, for each of first configuration 402, second configuration 404, and third configuration 406, Internet 108 communicates with ER 410 using a communication link 430.

As depicted in FIG. 4 with respect to first configuration 402, ER 410 communicates with SG 112 using a communication link 442 and ER 410 communicates with firewall 420 using a communication link 444. As depicted in FIG. 4 with respect to second configuration 404, ER 410 communicates with firewall 420 using a communication link 452 and firewall 420 communicates with SG 112 using a communication link 454. As depicted in FIG. 4 with respect to third configuration 406, ER 410 communicates with SG 112 using a communication link 462 and SG 112 communicates with firewall 420 using a communication link 464. The first configuration 402, second configuration 404, and third configuration 406 are configurable for supporting various functions.

With respect to first configuration 402 depicted and described with respect to FIG. 4, for traffic originating outside the enterprise (and destined for the enterprise), ER 410 routes all IPSec related traffic to the secure gateway and all other traffic to the firewall. The ER 410 identifies IPSec traffic using the protocol type in the IP header (e.g., 50 and 51) and port numbers used by protocols such as the Internet Key Exchange (IKE) protocol (e.g., UDP port 500). With respect to first configuration 402 depicted and described with respect to FIG. 4, for traffic originating within the enterprise, a routing mechanism routes IPSec traffic to the secure gateway and all other traffic to the firewall. In one embodiment, at least one interior routing protocol is run on SG 112 for directing all IPSec related traffic towards itself through strict partitioning and prioritization of address space. In this embodiment, SG 112 need only have forwarding capacity that accounts for the aggregate IPSec traffic.

With respect to second configuration 404 depicted and described with respect to FIG. 4, all traffic entering the enterprise goes to the firewall 420 (which has pinholes for IPSec related traffic that firewall 420 forwards to SG 112. In one such embodiment, firewall 420 sends all other traffic to SG 112, which potentially has a default route for such traffic. In this embodiment, SG 112 includes forwarding capacity for supporting both IPSec and non-IPSec traffic. In this embodiment, complicated routing protocol mechanisms are not required. In another such embodiment, firewall 420 sends all other traffic to a different device (not depicted). In this embodiment, as in first configuration 402, SG 112 only requires capacity sufficient for supporting IPSec traffic (however; complicated routing mechanisms may be required for routing traffic originating within the enterprise towards IPSec tunnel endpoints.

With respect to third configuration 406 depicted and described with respect to FIG. 4, as in various embodiments of first configuration 402 and second configuration 404, SG 112 SG 112 includes forwarding capacity for supporting both IPSec and non-IPSec traffic. In this embodiment, since SG 112 is disposed between ER 410 and firewall 420, all traffic arriving on IPSec tunnel endpoints is subject to the enterprise firewall policy. Although specific secure gateway deployment configurations have been depicted and described herein with respect to FIG. 4, the present invention is not intended to be limited to such secure gateway deployment configurations. The functions of the present invention may be supported using various other secure gateway deployment configurations.

As described with respect to FIG. 3, SG 112 may include one external interface to the public Internet (via an access router) and a plurality of internal interfaces to the enterprise network. In one embodiment, the actual use of the internal interfaces may depend on the secure gateway deployment scenario implemented by an enterprise. In one embodiment, in which an enterprise is partitioned into virtual local area networks (VLANs), the secure gateway may perform policy-based access control by mapping secure tunnels to established VLANs. In one embodiment, such secure tunnel mapping is performed for port-based VLANs. In one such embodiment in which the secure gateway supports multiple VLANs per port using, the multiple VLAN per port support is implemented in accordance with Institute of Electrical and Electronics Engineers (IEEE) 802.1q mechanisms.

In one embodiment, a secure gateway according to one embodiment of the present invention supports user authentication functions. In one embodiment, implementation of user authentication functions on a secure gateway may vary according to existing infrastructure deployed by an enterprise, among other reasons. In one embodiment, local (with respect to the secure gateway) user authentication is performed. In another embodiment, user authentication is performed using a RADIUS server. In another embodiment, user authentication is performed using a SecureID server. In another embodiment, user authentication is performed using various combinations of such user authentication functions.

In one embodiment, local (with respect to the secure gateway) user authentication is performed. In general, local authentication is a self-contained mechanism with respect to the secure gateway in which all information about users and passwords is maintained locally on the secure gateway (illustratively, memory 320 depicted in FIG. 3). In one embodiment, the storage may be in an encrypted form. It should be noted that the term password is being used loosely in this context and should not be equated solely with passwords used for login purposes. The term password here refers to all the information, including the user identification information and information stored in the secure client associated with the user, as described herein with respect to tunnel establishment and maintenance.

In one embodiment, user authentication is performed using a RADIUS server. In this embodiment, which leverages on the fact that numerous enterprises typically already employ a RADIUS server for performing various other functions, the secure gateway supports an associated RADIUS client in order to support authentication based on information provided by a RADIUS server. This embodiment avoids limitations of some other user authentication solutions (e.g., scalability, manageability, and the like). In one embodiment, user authentication is performed using a RSA SecureID server.

In one embodiment of the present invention, the secure gateway performs secure connection termination. In one embodiment, in which secure connections are supported using tunneling, the secure gateway performs tunnel termination. In one embodiment, tunneling is supported using at least one Internet Engineering Task Force (IETF) standard protocol including IPSec (IP Authentication Header AH) and IP Encapsulating Security Payload (ESP)), IKE, and like protocols). In general, establishing an IPSec tunnel involves: (1) encryption/decryption of the data being exchanged (supported using AH/ESP), and (2) maintaining security associations among the tunnel endpoints (supported using IKE). In one embodiment, different encryption/decryption mechanisms may be used based on IPSec policies configured by the user.

In one embodiment of the present invention, the secure gateway performs enterprise policy compliance assessments. In general, an important feature of any network access mechanism is the ability to assess compliance (with the policies defined by the enterprise) of devices (illustratively, endpoints 102) connecting to the network. In general, such compliance typically involves ensuring that the device includes the correct version of anti-virus software, all the patches recommended by the system administrator, and the like, as well as various combinations thereof. In one embodiment, non-compliant devices may be prevented from accessing the enterprise network. In one such embodiment, a device may receive an enterprise IP address only after passing a device compliance assessment.

In one embodiment, device compliance assessment may be performed using one of Dynamic Host Configuration Protocol (DHCP) negotiation (e.g., Microsoft NAP), at a layer below DHCP (e.g., Cisco NAC). In general, the Microsoft NAP solution is predominantly a PC oriented software solution, which is well suited for connecting PCs to corporate networks via VPNs (however, the Microsoft NAP solution requires configuration and management of an Internet Authentication Server (IAS)). In general, the Cisco NAC solution is primarily designed for hosts directly connecting to a corporate LAN, since it requires support from all infrastructure elements like switches, hubs and routers to which hosts can be attached. In one embodiment of the present invention, the secure gateway supports DHCP related extensions for enforcing device compliance assessments, as well as various other method of enforcing device compliance assessments.

In such embodiments, support for device compliance assessment may be required at the endpoint (e.g., gathering information about the device for comparison with the defined enterprise policies). Using the Microsoft NAP solution, such information may be collected by a Microsoft agent called the Quarantine Agent (QA), which exposes an Application Programming Interface (API) whereby various other agents (e.g., firewalls, virus scanners, and the like) may supplement existing information with additional information. In one embodiment, such information is gathered in a cooperative manner between the endpoint and software on the secure client.

In one embodiment, upon establishing a secure connection with the secure gateway, the endpoint (or user associated with the endpoint) is automatically put in a quarantine zone until the policy information is retrieved and the endpoint (or associated user) is deemed to be in compliance with enterprise policies. In case the endpoint is deemed non-compliant, the endpoint is connected to a read only store from which the required software updates/patches are automatically downloaded to the endpoint using the secure connection between the secure gateway and the secure client associated with the endpoint. Following reconfiguration of the endpoint, compliance of the endpoint with the enterprise policies is reassessed and, in the case the endpoint is deemed compliant, the endpoint is removed from the quarantine zone and placed into a standard work zone.

In one embodiment of the present invention, the secure gateway supports secure connections (e.g., tunnels) originating within the enterprise (illustratively, secure tunnels originating from LEs $102_L$ within EC 110 as depicted in FIG. 1). In one embodiment of the present invention, secure connections originating from within the enterprise provide a mechanism whereby the endpoint may be assessed with respect to enterprise policy compliance prior to receiving full Intranet access. In one embodiment, such compliance assessments may be performed as part of DHCP negotiation (i.e., Microsoft NAP solution). In another embodiment, such compliance assessments may be performed using a lower layer protocol (e.g., Cisco's NAC solution).

In one embodiment, if an endpoint successfully passes device assessment procedures, the secure tunnel may be torn down giving the endpoint normal access to the enterprise network. In one embodiment, if an endpoint does not successfully pass device assessment procedures, the secure tunnel may be used to patch the endpoint for bringing the endpoint into compliance before the secure tunnel is terminated. In one embodiment, the secure gateway is adapted for distinguishing between tunnel termination due to successful compliance and tunnel termination due to other reasons. In one such embodiment, enhanced tunnel termination procedures may be used by the secure gateway for distinguishing between tunnel termination due to successful compliance checks and termination due to other reasons.

FIG. 5 depicts a flow diagram of a method according to one embodiment of the invention. Specifically, method 500 of FIG. 5 comprises a method for transmitting information from a secure client. Although depicted as being performed serially, those skilled in the art will appreciate that at least a portion of the steps of method 500 may be performed contemporaneously, or in a different order than presented in FIG. 5. The method 500 begins at step 502 and proceeds to step 504. At step 504, information is transferred from an endpoint to an associated secure client.

At step 506, a determination is made as to whether a secure connection exists for transmitting the information from the secure client to a device in communication with a secure gateway. In one embodiment, since secure clients support "always-on" capability, a secure connection may exist (even if the associated endpoint is in an inactive state, e.g., powered-off). If a secure connection does exist, method 500 proceeds to step 516. In one embodiment, since mobile enterprise customers may move in and out of wireless coverage areas, a wireless network may not be available for supporting a secure connection between the secure client and the secure gateway. If a secure connection does not exist, method 500 proceeds to step 508.

At step 508, a determination is made as to whether a network is available. In one embodiment, a determination is made as to whether a wireless network is available. If a network is available, method 500 proceeds to step 516. In one embodiment, since mobile enterprise customers may move in and out of wireless coverage areas, a wireless network may not be available for supporting a secure connection between the secure client and the secure gateway. If a network is not available, method 500 proceeds to step 510. At step 510, the information received from the endpoint is stored locally by the secure client. In one embodiment, the information may be stored in a non-volatile flash memory on the secure client. The method 500 then proceeds to step 512.

At step 512, a determination is made as to whether a network is available. In one embodiment, a determination is made as to whether a wireless network is available If a network is not available, method 500 loops within step 512 until a network is detected for establishing a secure connection for transmitting the information. If a network is available, method 500 proceeds to step 514. At step 514, the information received from the endpoint is extracted from the secure client memory. The method 500 then proceeds to step 524.

At step 516, a determination is made as to whether transmission of the information received from the endpoint is delayed. In one embodiment, transmission may be delayed for any of a plurality of reasons for which transmission of information using the secure connection may be delayed, as described herein. For example, in one embodiment, requested information transfers may be analyzed for distinguishing between transfers requiring instant responses (e.g., audio conversations) and transfers not requiring instant responses (e.g., email transfers, data backup transfers, and the like), any information transfers not requiring instant responses may be delayed in response to various conditions (e.g., delayed until wireless signal quality satisfies a threshold, delayed when a threshold number of other clients are being served, and the like). If transmission of the information is not delayed, method 500 proceeds to step 524. If transmission of information is delayed, method 500 proceeds to step 518.

At step 518, the information received from the endpoint is stored locally by the secure client. In one embodiment, the information may be stored in a non-volatile flash memory on the secure client. The method 500 then proceeds to step 520. At step 520, a determination is made as to whether transmission criteria are satisfied. For example, in an embodiment in which requested information transfers are analyzed for distinguishing between delay-sensitive information transfers and delay-insensitive information transfers, the delay-insensitive information transfers are delayed until transmission criteria are satisfied (e.g., until wireless signal quality satisfies a threshold, until a threshold number of other clients are being served, and the like). If the transmission criteria are not satisfied, method 500 loops within step 520 until the transmission criteria are satisfied. If the transmission criteria are satisfied, method 500 proceeds to step 522. At step 522, the information received from the endpoint is extracted from the secure client memory. The method 500 then proceeds to step 524.

At step 524, information is transmitted from the secure client using the secure connection between the secure client and the secure gateway. In one embodiment of the present invention, since the secure client is adapted for maintaining the secure connection with the secure gateway independent of the power state (e.g., independent of active power states such as wake-up mode, powered-on, and the like, independent of inactive power states such as sleep mode, powered-off, and the like, and independent of any other valid power states) of the endpoint associated with the secure client, the secure client is adapted for transmitting the information independent of the power state of the endpoint associated with the secure client. The method 500 then proceeds to step 526, where method 500 ends.

FIG. 6 depicts a flow diagram of a method according to one embodiment of the invention. Specifically, method 600 of FIG. 6 comprises a method for receiving information at a secure client. Although depicted as being performed serially, those skilled in the art will appreciate that at least a portion of the steps of method 600 may be performed contemporaneously, or in a different order than presented in FIG. 6. The method 600 begins at step 602 and proceeds to step 604. At step 604, information is received at the secure client over a secure connection.

At step 606, a determination is made as to whether the endpoint associated with the secure client is active. If the endpoint associated with the secure client device is active, method 600 proceeds to step 614. If the endpoint associated with the secure client device is not active (e.g., the endpoint associated with the client device is in sleep mode, powered-off, and the like), method 600 proceeds to step 608. At step 608, the information received at the secure client is stored locally by the secure client. In one embodiment, the information may be stored in a non-volatile flash memory on the secure client. The method 600 then proceeds to step 610.

At step 610, a determination is made as to whether the endpoint associated with the secure client is active. If the endpoint associated with the secure client device is not active, method 600 loops within step 610 until the secure client detects that the endpoint associated with the secure client is active (e.g., until the secure client detects that the endpoint transitions from an inactive state (e.g., sleep mode, powered-off, and the like) to an active state (e.g., wake-up mode, powered-on, and the like). If the endpoint associated with the secure client device is active, method 600 proceeds to step 612. At step 612, the information received and stored by the secure client is extracted from the secure client memory. The method 500 then proceeds to step 614.

At step 614, information is transferred from the secure client to the associated endpoint. In one embodiment of the present invention, since the secure client is adapted for maintaining the secure connection with the secure gateway independent of the power state (e.g., powered-on, sleep mode, powered-off, and the like) of the endpoint associated with the secure client, the secure client is adapted for receiving various information (e.g., email messages, enterprise pushed software patches, and the like) while the associated endpoint is inactive, and then delivering the information to the endpoint in response to detecting that the endpoint has transitioned from an inactive state to an active state. The method 600 then proceeds to step 616, where method 600 ends.

As described herein, the present invention provides a secure system enabling enterprise users to securely access an enterprise network while increasingly utilizing broadband wireless networks. In one embodiment of the present invention, the "always-on" capability of the secure client device enables constant communication between the endpoint device and the enterprise network. The secure, "always-on" system enables support of various features benefiting end users and system administrators. The features enabled by the secure, "always-on" system may include application acceleration features, remote management features, wireless network optimization features, and like features, as well as various combinations thereof.

In one embodiment, the secure system described herein ensures that, in an endpoint including a secure client, the only available IP network access for that endpoint is via the enterprise internal network. In one such embodiment, the secure system described herein ensures that, when an endpoint is outside the enterprise, the only IP network access for that endpoint is via a secure tunnel terminating inside the enterprise. In accordance with one embodiment of the present invention adapted for supporting such security objectives, the secure system ensures that a user not logged in on the endpoint (or logged into a non-privileged account on the endpoint) is unable to defeat the primary security objective by any means (including various combinations of inserting/removing the secure client, power-cycling the endpoint, performing operations using the keyboard, mouse, and removable storage media on the host PC, and the like.

In one embodiment, the secure system described herein ensures that the endpoint is unusable without a corresponding secure client associated with that endpoint. In one embodiment, the secure system detects and reports any attempts (successful or not) to breach the secure system. As such, even if the user of an endpoint obtains administrative privileges, attempts to evade the limitations enforced by the secure solution are likely to fail. Furthermore, even if the secure system is attacked by an advanced software or hardware hacker, an attempt to evade the limitations enforced by the secure system are detected and reported, and successful exploits are closed by updates pushed from a management system to the secure client using a secure connection between the secure gateway and the secure client.

As described herein, secure connections in accordance with the secure system of the present invention may be implemented using secure tunnels. In one such embodiment, secure tunnels originate on secure clients and terminate on secure gateways. In one such embodiment, the endpoint associated with the secure client ensures that all network communications traverse the secure client. In order to establish a secure tunnel according to one embodiment of the present invention (i.e., for supporting various functions of the present invention), various actions are performed, including selecting a host interface, obtaining an IP address, and selecting a secure gateway with which the secure tunnel is established.

In general, a computing device may have multiple network interfaces (possibly of different types). In addition to the network interfaces potentially supported by an endpoint, the secure client associated with the endpoint supports a wireless network interface. As such, the associated user has various options for establishing a network connection. In order to support the "always on" functionality of the present invention, the secure client wireless network interface is always connected to the wireless network, and, as such, is accessible from the endpoint. In one embodiment of the present invention, all traffic associated with the endpoint will pass through the secure client. The secure client performs IPSec processing for all interfaces in the endpoint, including the wireless network interface in the secure client.

In one embodiment, a combination of endpoint and secure client components cooperate for obtaining an IP address, responding to device compatibility assessment procedures, and establishing a secure tunnel to the secure gateway. In order to communicate on the Internet, a computing device must have an IP address and other information such as a default gateway, domain name service (DNS) servers, and the like. This information is typically obtained through static assignment on the computer, via a server using the DHCP protocol, and the like. In a normal setting, a user is free to access the Internet once an IP address (i.e., a non-Enterprise IP address) is obtained.

In this embodiment, after obtaining the non-enterprise IP address, the secure client attempts to establish a secure tunnel with the secure gateway. In one embodiment, in which an enterprise deploys a single secure gateway, an enterprise IP address is then obtained from the secure gateway. In another embodiment, in which an enterprise deploys a plurality of secure gateways, the secure gateway with which the secure tunnel is established must be selected. In this embodiment, selection of the secure gateway to which the secure tunnel is established may be based on at least one of preconfigured static information, dynamic information facilitating a notion of load balancing, and the like. In one embodiment, selection of the secure gateway may be used during secure gateway failure scenarios in addition to initial secure tunnel establishment.

In this embodiment, following obtaining of the non-enterprise IP address and identifying the secure gateway to which the secure tunnel should be established, the secure client obtains an IP address (i.e., enterprise IP address) from the secure gateway. The endpoint applications may only access the network through the enterprise IP address (i.e., endpoint applications cannot access the network through the non-enterprise IP address). In one embodiment, negotiation (e.g., using DHCP) for obtaining a non-enterprise IP address and subsequent establishment of the secure tunnel is performed by the secure client and hidden from the endpoint.

In this embodiment, following obtaining of the enterprise IP address, a secure tunnel is established between the secure client card and the secure gateway. In one such embodiment, tunnel establishment is performed using standard IPSec procedures (including IKE). In one embodiment, authentication is performed as a portion of tunnel establishment with the secure gateway. In one embodiment, authentication may be based on user identification, such as a pass phrase or digitized finger print and a secret key produced by an associated VPN keycard, hence compromising only the user identification or the VPN card will not compromise the system. In general, a VPN keycard is uniquely associated with a user. The secure client card performs user identification in cooperation with endpoint software. In one embodiment, following establishment of the secure tunnel and before use of the secure tunnel by the endpoint software, a device check may be performed in a coordinated manner by the endpoint software, the secure client, and the secure server.

In one embodiment, following establishment of the secure tunnel, the secure client and secure gateway cooperate to maintain the secure tunnel in a manner both transparent to the user associated with the endpoint and efficient in terms of wireless network resources. For example, in one embodiment, in which a wireless network becomes unavailable and the user places the endpoint in a powered-off mode, upon detecting availability of a wireless network, the secure client may reestablish a secure tunnel with the secure gateway. As such, in one embodiment of the present invention, the secure client may transmit stored information (obtained from the associated endpoint and stored locally by the secure client while wireless network connectivity is unavailable) and receive and store information (obtained from the enterprise Intranet and stored locally by the secure client while the endpoint is powered-off) using the secure connection even though the endpoint is powered-off.

As described herein, the secure system, including the secure client and secure gateway, of the present invention supports application acceleration functions. In general, enterprise users have become accustomed to high-quality, high speed connectivity at work and at home, and expect the same experience from remote connectivity. The present invention includes various application acceleration functions for providing high-quality, high speed remote connectivity. In one embodiment of the present invention, application acceleration functions may include caching functions (e.g., for background transfers), traffic filtering functions (e.g., at the secure client, secure gateway, and the like), compression functions (e.g., data compression, protocol header compression, and the like), tunnel address translation functions, protocol optimization functions, and the like, as well as various combinations thereof.

In one embodiment, the present invention provides caching on the secure client. In one such embodiment, the secure client includes an in-line, bidirectional, transparent application caching proxy. The caching proxy resides above the IPSec layer, and caches data in both directions (i.e., from the endpoint toward the network and from the network toward the endpoint). In one embodiment, the secure client caches user credentials, although a limited amount of credential caching may be done in the volatile memory without compromising security. In one embodiment, the secure client caches application data in both directions for applications such as email, calendar (i.e., Microsoft Exchange), web feeds (e.g., RSS 2.0), and like applications, as well as various combinations thereof.

Since the secure client remains active even when the endpoint is powered-off (e.g., in a sleep state), various data transfers may be performed using the cache while the endpoint is powered-off. In one embodiment, since the secure client maintains a secure connection with the network, the cache on the secure client may be used for storing data received from the network using the secure connection. In one further embodiment, upon detecting activation of the endpoint associated with the client device, at least a portion of the cached network data may be transferred to the endpoint memory. In one embodiment, since the secure client maintains a secure connection with the network, the cache on the secure client may be used for uploading (via the secure connection with the network) data buffered using the cache on the secure client.

In one embodiment, in order to conserve wireless bandwidth (especially when the radio link is in the dormant mode), the present invention provides application traffic filtering for eliminating unnecessary traffic. The application traffic filtering may be performed by at least one of the secure client, the secure gateway, and the like, as well as various combinations thereof. In one embodiment, at least a portion of broadcast traffic (e.g. RIP, OSPF, ARP, and the like) may be filtered. For example, since routing updates are unnecessary for the user, ARP may be suppressed using proxy ARP at either end of the secure tunnel. In one embodiment, NetBIOS may be filtered. In one embodiment, at least a portion of the filtered traffic may be proxied using cache data.

In one embodiment, in addition to or in place of application traffic filtering, the present invention may operate various applications according to different operating parameters. In one embodiment, applications may be run with a reduced update frequency. For example, email and RSS feeds may be polled every five minutes rather than every thirty seconds. In one embodiment, application requests may be bunched together. For example, for TCP connections, "keepalive" requests may be bunched into one interval, proxied at either end of the secure tunnel, and the like. Although primarily described herein with respect to application data filtering and modification of application operating parameters, various other method of conserving wireless bandwidth according to one embodiment of the present invention may be used.

In one embodiment, the present invention provides compression capabilities in support of application acceleration. In one embodiment, application data may be compressed. In one such embodiment, application data compression may be performed using the IPCOM compression standard in conjunction with IPSec. It should be noted that while such compression may be useful for textual data, e.g., XML, such compression is less useful for binary files (e.g., GIF, ZIP, EXE, MPEG, and the like) which are typically already compressed. In one embodiment, protocol headers may be compressed. In one such embodiment, protocol headers may be compressed using VJ compression for User Datagram Protocol (UDP), Transmission Control Protocol (TCP), and Internet Protocol (IP) inner header compression.

In one embodiment, the present invention provides tunnel address translation (TAT) capabilities in support of application acceleration. In general, tunnel address translation is a distributed Network Address Translation (NAT) operation whereby a tunneled header can be NATed at one end of a tunnel and deNATed at the other end of the tunnel. In conventional tunneling, an additional UDP/IP header is affixed to the original TCP/IP or UDP/IP header of the packet. As a result, each packet is associated with two source IPs, two destination IPs, two source ports and two destination ports (i.e., one for the outer header and one for the inner header). In one embodiment, TAT implementation requires flow initiation and flow termination detection, which may be performed using flow filtering, application snooping (e.g. snoop on SIP INVITE payloads), and the like.

In this embodiment, by noting that for all flows, the outer header addresses and ports are invariant, and in addition, for a given flow, the inner header addresses and ports are invariant, each flow may be remapped to a new single header which encapsulates both the outer and inner headers. In this embodiment, a TCP flow would need a TCP/IP header and a UDP flow would need a UDP/IP header. For example, considering UDP flows (e.g., audio conversations and video streaming), eliminating the inner UDP/IP header would eliminate twenty-eight bytes for each packet, considerably improving the wireless link efficiency. Similarly, for TCP flows, eliminating the outer UDP/IP header would eliminate twenty-eight bytes of overhead per packet.

In one embodiment, the present invention provides protocol optimization capabilities in support of application acceleration. In one embodiment, protocol optimization includes TCP optimization. In one such embodiment, TCP optimization may include retransmitting TCP segments proactively in response to link loss. In one embodiment, since wireless bandwidth is a scarce resource, protocol optimization may include application prioritization (including packet scheduling according to application prioritization) for restricting the available bandwidth of low-priority applications. For example, audio traffic may be configured to have a high priority while email may be configured to have a low priority.

As described herein, the secure system, including the secure client and secure gateway, of the present invention supports remote system administration functions. In one embodiment, since secure clients operate irrespective of the state of the endpoint in which the secure client is disposed (i.e., secure clients support "always on" capabilities), a system administrator may remotely access secure clients irrespective of the state of the endpoint in which the secure client is disposed. In one embodiment, the secure gateway with which the secure client maintains a secure connection supports remote access of the secure client by the system administrator.

In one embodiment, remote access of a secure client by a system administrator enables the system administrator to perform various secure client maintenance and control activities. In one such embodiment, a system administrator may determine the current software versions of the secure client and the associated endpoint, determine inventories of software upgrades/patches for secure client software and endpoint software (including latest versions of antivirus or other software installed in the secure client or endpoint), access and read network activity logs (e.g., up time and down time information), determine whether the user associated with the endpoint has attempted to violate any of the policies (e.g., removing the secure client driver from the endpoint, removing the endpoint driver from the endpoint, and the like).

In one embodiment, remote access of a secure client by a system administrator enables the system administrator to push software updates to the secure client. In one embodiment, since secure clients support "always on" capabilities, system administrators may push updates to secure clients while the associated endpoints are powered-off. In this embodiment, information (e.g., software updates, emails, and the like) received by the secure client while the associated endpoint is powered-off results in storage of the received information in the local flash memory of the secure client. In this embodiment, the information stored in the flash memory of the secure client is transferred from the secure client to the endpoint (i.e., becomes immediately available to the user) when the endpoint is powered-on.

In one embodiment, remote access of a secure client by a system administrator enables the system administrator to push software updates to the secure client in response to detected conditions. For example, if the remote enterprise user is participating in an important meeting requiring immediate access to information and the endpoint cannot be used until software updates are loaded (i.e., the endpoint becomes virtually unusable due to consumption of endpoint and bandwidth resources required for downloading the installing the software updates), the productivity of mobile workers is affected. In one such embodiment, the present invention enables system administrators to push information to secure clients in response to a determination that the endpoint functionality associated with the secure client is not being used (e.g., one or more endpoint processes is idle, the endpoint is in sleep mode, the endpoint is powered-off, and the like).

In one embodiment, remote access of secure clients enables remote system upgrades and patches on the secure clients. In one embodiment, an enterprise system administrator pushes system image, software module (including dynamic loadable device driver modules) upgrades and patches, from a management system (illustratively, MS 116 depicted in FIG. 1) to the secure client memory (e.g., using at least one of DRAM, flash memory, and the like, depending on the size of the software) via an established secure tunnel. In one embodiment, associated software upgrade and patch commands may be executed on the secure client embedded system remotely after the required software is downloaded onto the secure client.

In one embodiment, secure client software upgrades and patches are performed in a manner transparent to the associated enterprise user using the associated endpoint. In another embodiment, in order to minimize the interruption of endpoint usage by an enterprise user, an endpoint user dialogue interface may be implemented for instructing the secure client system of the resource-intensive upgrade/patch process.

In one such embodiment, endpoint user dialogue interface may present selectable options enabling the enterprise user associated with the endpoint to initiate (e.g., "upgrade now") or postpone (e.g., "upgrade in one hour") the upgrade/patch process.

In one embodiment, secure client software upgrades and patches include various capabilities for upgrading and patching secure client configurations, security parameters, security policies, and the like, as well as various combinations thereof. In one embodiment, the secure client embedded system includes a file download manager that balances the upgrade and patch software download and normal network interface usage to improve user experience. The download manager uses segmented file download technology to handle network interruption, disconnect and reconnect, large file download in low speed network environment, and the like, as well as various combinations thereof.

In one embodiment, remote access of endpoints enables remote system upgrades and patches on the endpoints. In one embodiment, a management system performs remote operating system and software upgrades and patches, anti virus software definition updates, enterprise system policy updates, and the like, as well as various combinations thereof, on the endpoint. Since many such tasks are supported in existing enterprise IT infrastructure, such as Microsoft System Management Server (SMS) or third party vendor solutions, the management system may utilize the existing solutions for performing these and similar tasks using secure connections (e.g., an enterprise VPN).

In one embodiment, the management system improves execution of endpoint software upgrades and patches tasks by promptly scheduling the critical upgrades and patches download, and utilizing a client file download manger for completing the tasks more efficiently, thereby minimizing endpoint interference. As described herein, flash memory on the secure client may be used to buffer the download files such that no endpoint resources are consumed before the download is finished. In one embodiment, endpoint software, device driver, and profile upgrades and patches may be intergraded into existing enterprise solutions.

As described herein, the secure system, including the secure client and secure gateway, of the present invention supports wireless network optimization functions. In one embodiment, wireless network optimization is performed by prioritizing application data transfers in accordance with application response time requirements. In one such embodiment, data transmissions associated with applications which do not require instant response time (e.g., email, data backup, and the like) are delayed. In one embodiment, secure clients distinguish between delay-sensitive information transfers and delay insensitive information transfers, and request that associated base stations only initiate delay-insensitive information transfers: (1) if the wireless signal quality satisfies a threshold and (2) if the base station satisfies a threshold number of customers requiring service. In one embodiment of the present invention, such optimization enables significant wireless network capacity improvements, thereby introducing significant cost benefits for wireless service providers.

Although various embodiments which incorporate the teachings of the present invention have been shown and described in detail herein, those skilled in the art can readily devise many other varied embodiments that still incorporate these teachings.

What is claimed is:

1. A secure client device configured to provide a secure client capability for a host computer having a host processor and a host memory, the secure client device comprising:
a network interface module configured to maintain a secure connection between the secure client device and a network device independent of a power state of the host computer;
a client memory configured to store information associated with the secure connection, wherein the information associated with the secure connection comprises information received over the secure connection; and
a client processor configured to automatically initiate establishment of the secure connection and, in response to a determination that the host computer is in an inactive state, store the information received over the secure connection in the client memory.

2. The secure client device of claim 1, wherein the client processor is configured to automatically initiate establishment of the secure connection in response to a trigger condition.

3. The secure client device of claim 2, wherein the trigger condition comprises detecting an available network.

4. The secure client device of claim 2, wherein the trigger condition comprises detecting a request from the network device.

5. The secure client device of claim 1, wherein the client memory comprises at least one non-volatile memory component.

6. The secure client device of claim 1, wherein the information associated with the secure connection comprises information assigned for transmission over the secure connection.

7. The secure client device of claim 1, further comprising:
a host interface module coupled to the client processor, wherein the host interface module is configured to support communications between the secure client device and the host computer.

8. The secure client device of claim 7, wherein the client processor is configured to:
in response to detecting a transition of the host computer from the inactive state to an active state, retrieve the information received over the secure connection from the client memory and propagate the information received over the secure connection toward the host computer via the host interface module.

9. The secure client device of claim 1, wherein the information received over the secure connection comprises information pushed by at least one network element in communication with the network device.

10. The secure client device of claim 1, wherein the information associated with the secure connection comprises information assigned for transmission over the secure connection, wherein the client processor is configured to:
in response to a determination that the secure connection is unavailable, store the information assigned for transmission over the secure connection, wherein the information assigned for transmission over the secure connection is stored in the client memory.

11. The secure client device of claim 10, wherein the client processor is configured to:
in response to a determination that an access network is available:
initiate reestablishment of the secure connection between the secure client device and the network device;
retrieve the information assigned for transmission over the secure connection from the client memory; and
propagate the information assigned for transmission over the secure connection toward the network device using the secure connection.

12. A method for a secure client device to provide a secure client capability for a host computer having a host processor and a host memory, the method comprising:
receiving information from the host computer at the secure client device, wherein the secure client device comprises a client processor and a client memory;
transmitting the information from the host computer from the secure client device toward a network device using a secure connection between the secure client device and the network device, wherein establishment of the secure connection is initiated automatically by the client processor of the secure client device, wherein the secure connection is maintained by the secure client device independent of a power state of the host computer;
receiving, at the secure client device via the secure connection, information intended for the host computer; and
storing the information intended for the host computer in the client memory of the secure client device in response to a determination that the host computer is in an inactive state.

13. The method of claim 12, further comprising:
storing the information from the host computer in the client memory of the secure client device in response to a first condition.

14. The method of claim 13, further comprising:
extracting the information from the host computer from the client memory of the secure client device in response to a second condition.

15. The method of claim 14, wherein the first condition comprises a network being unavailable and the second condition comprises the network being available.

16. The method of claim 14, wherein the first condition comprises a determination to delay transmission of the information from the host computer and the second condition comprises a threshold being satisfied.

17. A method for a secure client device to provide a secure client capability for a host computer having a host processor and a host memory, the method comprising:
receiving information at the secure client device, wherein the information is received over a secure connection between the secure client device and a network device, wherein the secure client device comprises a client processor and a client memory, wherein establishment of the secure connection is initiated automatically by the client processor of the secure client device, wherein the secure connection is maintained by the secure client device independent of a power state of the host computer;
storing the information in the client memory of the secure client device in response to a determination that the host computer is in an inactive state; and
transferring the information from the secure client device toward the host computer.

18. The method of claim 17, further comprising:
in response to detecting a transition of the power state of the host computer from the inactive state to an active state, extracting the information from the client memory of the secure client device and transferring the information from the secure client device toward the host computer.

* * * * *